United States Patent [19]

Sikorski

[11] 4,205,438

[45] Jun. 3, 1980

[54] SCORING TOOL

[75] Inventor: Richard D. Sikorski, Lackawanna, N.Y.

[73] Assignee: Gripp-Ease Tool Inc., Lackawanna, N.Y.

[21] Appl. No.: 9,929

[22] Filed: Feb. 7, 1979

[51] Int. Cl.² .................. B26B 25/00; C03B 33/10
[52] U.S. Cl. ............................. 30/164.9; 30/164.95
[58] Field of Search ............ 30/164.9, 164.95, 343, 30/344

[56] References Cited

U.S. PATENT DOCUMENTS

| 2,382,304 | 8/1945 | Foltz | 30/343 |
|---|---|---|---|
| 2,827,697 | 3/1958 | Woodel | 30/169 X |
| 2,847,758 | 8/1958 | Kozan | 30/164.9 |
| 3,790,052 | 2/1974 | Toll | 30/164.9 |
| 4,161,819 | 7/1979 | Pietrantonio | 30/164.95 |

*Primary Examiner*—Jimmy C. Peters
*Attorney, Agent, or Firm*—Sommer & Sommer

[57] ABSTRACT

An improved scoring tool has a uniquely configured tip arranged to be inserted into a cooperative recess provided in a pistol-shaped handle. The handle has an upper tip-holding portion, and a graspable portion extending downwardly away from the tip-holding portion. The front surface of the graspable portion is provided with a plurality of undulations to accommodate the fingers of an operator grasping the handle with a prehensile grip. The improved tip is provided with a sharpened point formed by the mutual intersection of four surfaces. A modified tip is provided with a glass-cutting wheel. The shape of the handle allows the operator to maintain adequate control, while exerting greater downward pressures to more deeply and clearly score sheet material.

7 Claims, 7 Drawing Figures

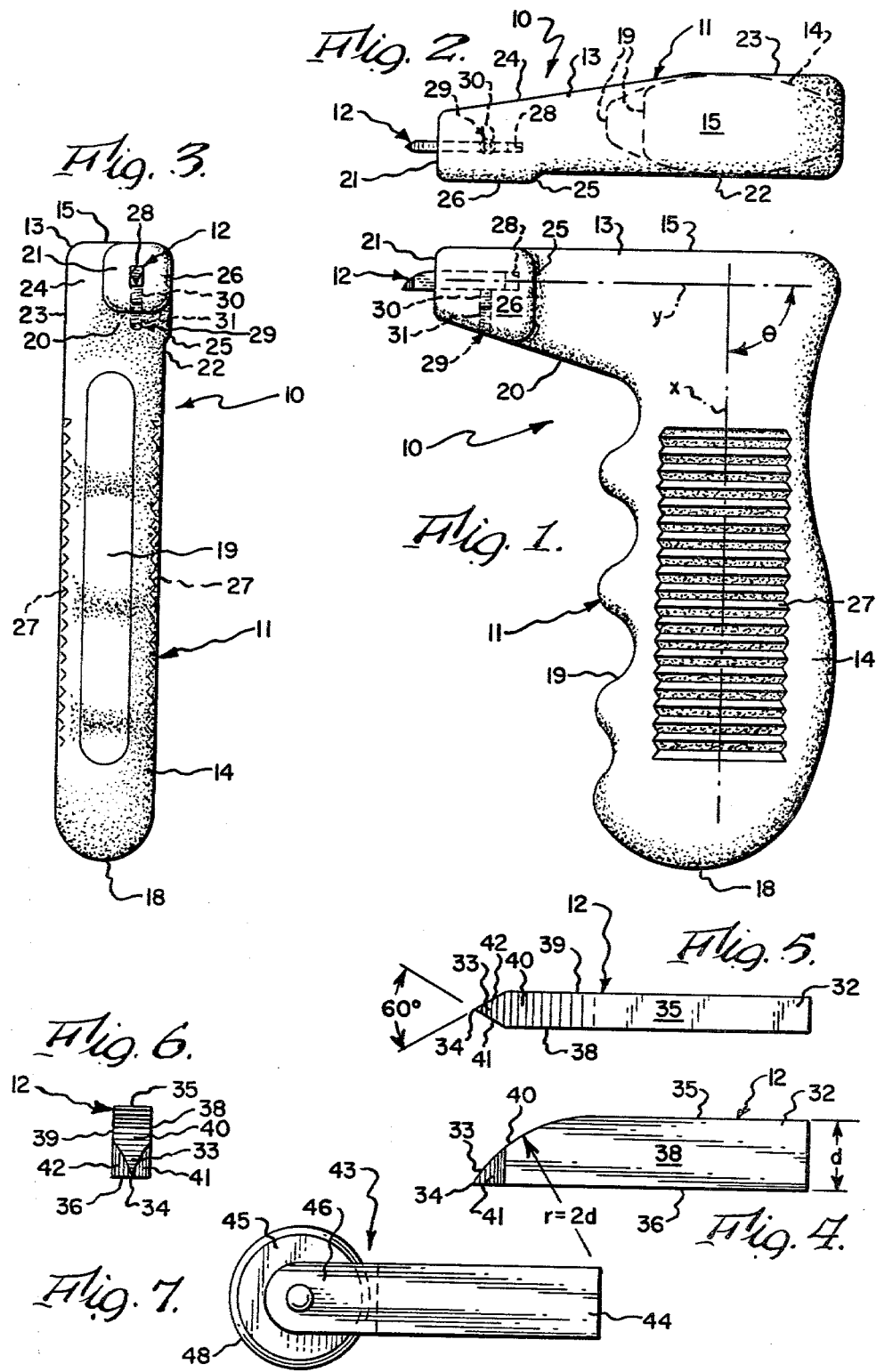

SCORING TOOL

BACKGROUND OF THE INVENTION

1. Field of the Invention

The present invention relates generally to the field of scoring tools, and more particularly to an improved tool for scoring sheet material, such as plastic, plexiglass, laminate, countertop, and the like.

2. Description of the Prior Art

It has long been known that certain plastic sheet materials, such as plastic, plexiglass, laminate, countertop, and the like are "cut" by first scoring a line, and thereafter snapping the sheet material apart along such score line. Hence, such plastic sheet materials are "cut" much in the same manner that glass is "cut".

Heretofore, upon information and belief, known forms of scoring tools have comprehended a sharpened knife-edge, and/or a handle which extended generally away from the axis of the knife-edge at a relatively small acute included angle. By comparison, glass cutters have a pointed wheel journalled on one end of a rod-like handle. With either form of such prior art type of scoring tools, it has been difficult to apply sufficient downward pressure, while simultaneously maintaining adequate control, as the tool is drawn across the material to be scored.

SUMMARY OF THE INVENTION

The invention provides an improved scoring tool which broadly comprises a pistol-shaped handle and a tip insertable therein. The handle has a graspable portion and a tip-holding portion. The handle is provided with a recess extending rearwardly into the tip-holding portion from a forward surface thereof. The graspable portion is elongated along an axis which extends away from the axis of the recess. The forward surface of the graspable portion has a plurality of undulations adapted to receive the fingers of a person grasping the handle. The handle further includes means for selectively holding the shank portion of a tip inserted into the recess.

In one form, the tip has a forward scoring portion which is defined by a point formed by four mutually-intersecting surfaces. Preferably, the tip engages the sheet material substantially in point contact, as opposed to line contact. A modified tip has a glass cutting wheel journalled on the scoring portion.

Accordingly, one object is to provide an improved scoring tool.

Another object is to provide an improved scoring tool which permits the use of increased downward pressure, and increased control as the tool is drawn across a sheet of material to be cut.

Another object is to provide an improved tip for use in association with a scoring tool.

Still another object is to provide an improved handle for use in a scoring tool.

These and other objects and advantages will become apparent from the foregoing and ongoing specification, the drawings, and the appended claims.

BRIEF DESCRIPTION OF THE DRAWINGS

FIG. 1 is a left side elevation of the improved scoring tool.

FIG. 2 is a top plan view thereof.

FIG. 3 is a front elevation thereof.

FIG. 4 is a left side elevation of a sharpened tip used in the scoring tool shown in FIGS. 1-3.

FIG. 5 is a top plan view of the tip shown in FIG. 4.

FIG. 6 is a front elevation of the tip shown in FIG. 4.

FIG. 7 is a left side elevation of an alternative glass-cutting tip adapted to be used with the improved handle.

DESCRIPTION OF THE PREFERRED EMBODIMENT(S)

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIGS. 1-3 thereof, the invention provides an improved scoring tool, of which the presently preferred embodiment is generally indicated at 10, which is particularly suited for use in scoring or "scratching" plastic sheet materials (not shown), such as plastic, plexiglass, laminate, countertop, and the like. Persons skilled in this art will appreciate that such plastic sheet materials are "cut" by scoring a line, and then breaking the sheet material along the scored line, much in the same manner as glass is "cut".

Referring now to FIGS. 1-3, the improved scoring tool is shown as broadly including a handle 11, and a tip 12 mounted on the handle.

The handle 11 is shown as being an integrally-formed plastic member, configured to somewhat resemble a pistol. Specifically, the handle has an upper tip-holding portion 13 and a graspable portion 14 extending downwardly therefrom. When viewed in left side elevation (FIG. 1), the pistol-shaped handle appears to have an upper horizontal rectangular planar surface 15, and (proceeding clockwise therefrom) a reversely-curved rear surface 16 extending downwardly therefrom, a lowermost convex or rounded butt surface 18 at the bottom of the graspable portion, an undulating forward surface 19 on the graspable portion, a forwardly and upwardly inclined planar surface 20, and a tip portion rectangular vertical forward surface 21 continuing upwardly therefrom to join upper surface 15. When viewed in front elevation (FIG. 3), the tip-holding portion appears to have opposite generally planar vertical left and right side surfaces 22, 23, respectively, although the graspable portion has a somewhat oval-shaped transverse cross-section (FIG. 2). As best shown in FIG. 3, the butt surface 18 is also rounded or convex in the transverse direction. Referring now to FIG. 2, the right side of the tip-holding portion 13 is shown as having a forwardly and leftwardly inclined planar surface 24 joining the tip-holding portion forward surface 21.

The improved handle is further shown as including a raised rectangular boss 25 which extends laterally and leftwardly outwardly from the tip-holding portion left side surface 22. This boss 25 terminates in an outermost trapezoidal-shaped vertical planar surface 26, which is generally parallel to left side surface 22. This boss planar surface 26 is adapted to slidably engage a straight-edge when the tool is drawn across material to be scored. The undulations on the graspable portion forward surface 19 appear to be somewhat sinusoidal, as seen in FIG. 1, and are adapted to receive, in the valleys thereof, the fingers of a person grasping the handle. In FIGS. 1 and 3, the left and right side surfaces of the graspable portions are shown as being ribbed at 27, although these ribs need not be invariably provided. The portions joining the adjacent surfaces heretofore described are generally in smooth continuous transition from one to the other.

Still referring principally to FIGS. 1-3, a recess 28, having a rectangular transverse cross-section, is shown as extending rearwardly into the tip-holding portion from the forward surface 21 thereof. This recess is adapted to receive slidable insertion of the shank portion of a tip, as hereinafter described.

The handle 11 is further shown as including means, generally indicated at 29, for selectively holding the shank portion of a tip inserted into the recess. In the preferred embodiment, this means 29 comprises a slotted set screw 30 threaded into a tapped vertical hole 31 extending between surface 20 and the recess. Hence, this set screw 30 may selectively be tightened to engage the shank portion of an inserted tip. The longitudinal axis x of the graspable portion is shown as being arranged to intersect the horizontal axis y of the recess, at an imaginary acute inclined angle θ. In the preferred embodiment, the graspable portion axis x extends normally away from recess axis y. Hence, in the illustrated embodiment, θ=90°. However, the present invention contemplates that this angle may be readily varied, and preferably between 30° to 120°.

Referring now in particular to FIGS. 4–6, the tip 12 is shown as having a rearward shank portion 32, and a forward scoring portion 33 terminating in a forwardmost sharpened point 34. The tip is shown as being formed from rectangular stock material having parallel upper and lower planar horizontal surfaces 35, 36, and parallel left and right planar vertical side surface 38, 39. The forward face of the tip is shown as being rounded at 40. The radius of this surface 40 is approximately twice the distance between tip surfaces 35, 36. The sharpened point 34 is formed at the mutual intersection of four surfaces, namely, lower planar surface 36, front rounded surface 40, and forwardly and inwardly inclined vertical left and right planar surfaces 41, 42, all of which converge at point 34. The included angle between surfaces 41, 42 is preferably about 60°.

As best shown in FIGS. 1-3, tip shank portion 32 is is slidably inserted into the handle recess 28, and is selectively secured in this position by tightening of set screw 30. The tip is preferably formed from a suitable hardened material such as tungsten carbide.

Referring now to FIG. 7, a modified tip, generally indicated at 43, is shown as having a rearward shank portion 44 similar to the shank portion 32 heretofore described. However, an annular glass-cutting wheel 45 is journalled on the forward portion 46 of tip 43. Persons skilled in this art will appreciate that such wheel has a sharpened annular surface terminating in an annular line 48, which may be drawn across a sheet of glass. This glass-cutting tip 43 may be inserted in the handle in the manner heretofore described for the scoring tip 12.

In use, the handle may be conveniently grasped by an operator. The tip may be drawn across the sheet material to be scored, with boss surface 26 sliding along a guiding straight-edge. The unique shape of the handle enables the operator to apply sufficient downward pressure on the sheet, while maintaining control over the movement of the handle. The undulations on the graspable portion accommodate the operator's fingers in a prehensile grip so as to minimize the opportunity for slippage between his hand and the tool. The unique shape of tip 12 has been found to be highly effective in making the desired score line. At the same time, it will be appreciated that the sharpened point 34 of tip engages the sheet substantially in point contact, as opposed to line contact contemplated by conventional draw knives. Needless to say, a boss guide surface may be provided on the right side, if desired.

Therefore, while the presently preferred embodiment of the inventive scoring tool has been shown and described, persons skilled in this art will appreciate that various additional modifications and changes may be made without departing from the spirit of the invention, as defined by the following claims.

What is claimed is:

1. A scoring tool, comprising:
   a pistol-shaped handle having a graspable portion and a tip-holding portion, said handle being provided with a recess extending rearwardly into said tip-holding portion from a forward surface thereof, said graspable portion being elongated along an axis which extends away from the axis of said recess, the forward surface of said graspable portion having a plurality of undulations arranged to receive the fingers of a person grasping said graspable portion, said handle further including means for selectively holding the shank portion of a tip inserted into said recess, a raised boss extending laterally outwardly from said tip-holding portion, said boss having an outermost planar surface including a line parallel to the axis of said recess, said boss surface being adopted to slidably engage a straight-edge to guide the movement of said tip when said tool is drawn across a material to be scored; and
   a tip having a rearward shank portion arranged in said recess and having a forward scoring portion.

2. A scoring tool as set forth in claim 1 wherein said included angle between said recess and graspable portion axes is from 30 to 120 degrees.

3. A scoring tool as set forth in claim 1 wherein the undulations on said graspable portion forward surface are substantially sinusoidal.

4. A scoring tool as set forth in claim 1 wherein at least one side surface of said graspable portion is ribbed.

5. A scoring tool as set forth in claim 1 wherein said tip forward scoring portion has a sharpened point adapted for use in scoring a line in a plastic material.

6. A scoring tool as set forth in claim 1 wherein said tip scoring portion has a pointed wheel for use in scoring glass.

7. A scoring tool as set forth in claim 1 wherein said tip-forward scoring portion terminated in a forwardmost sharpened point, said point being formed by the intersection of a lower horizontal planar surface, an upper convex surface, and two vertical forwardly-convergent lateral surface.

* * * * *